Jan. 12, 1926.  
C. W. HAZELETT ET AL  
STORAGE BATTERY CONTAINER  
Filed Feb. 2, 1922  
1,569,125  
3 Sheets-Sheet 1
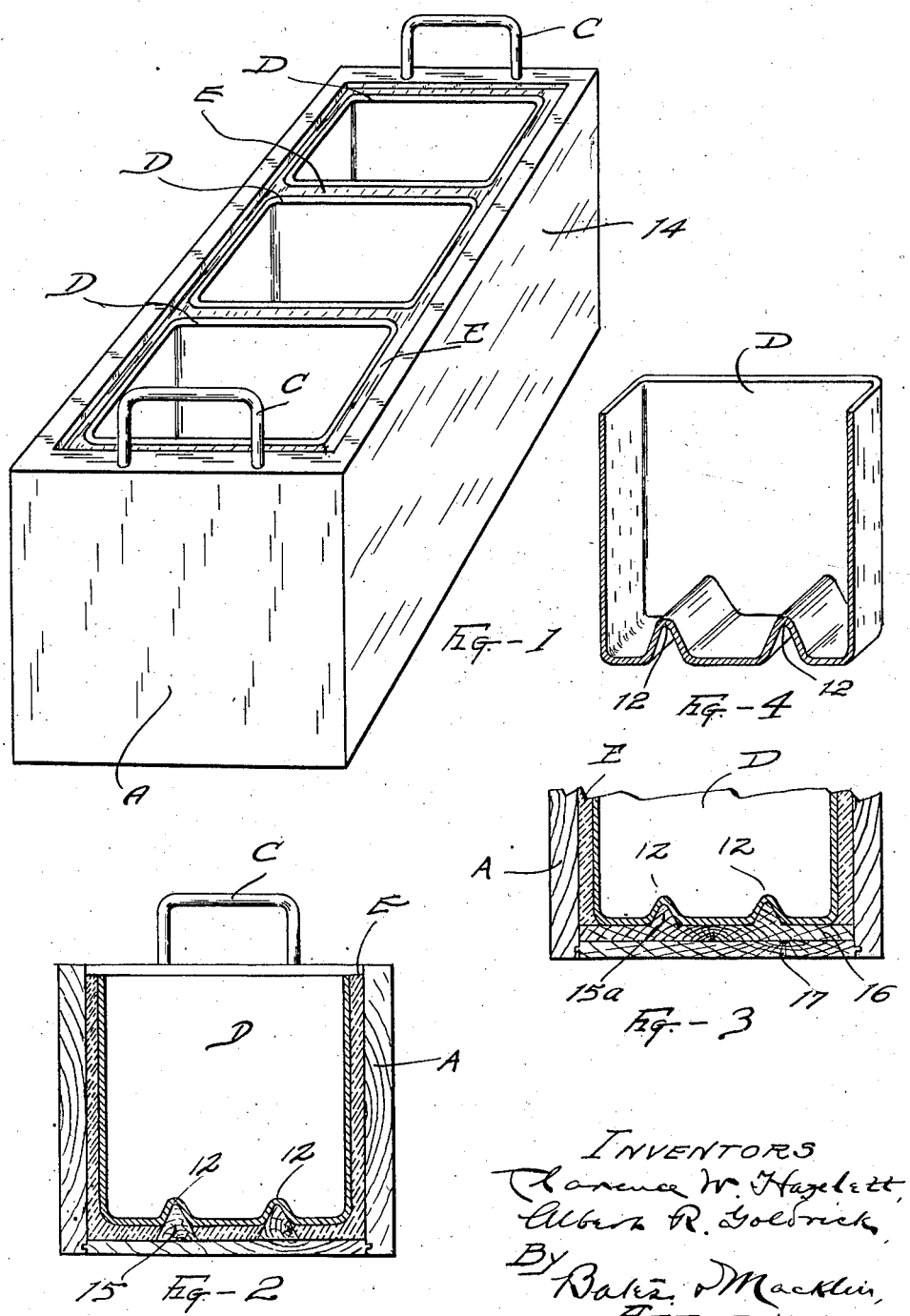

Jan. 12, 1926. 1,569,125
C. W. HAZELETT ET AL
STORAGE BATTERY CONTAINER
Filed Feb. 2, 1922  3 Sheets-Sheet 2
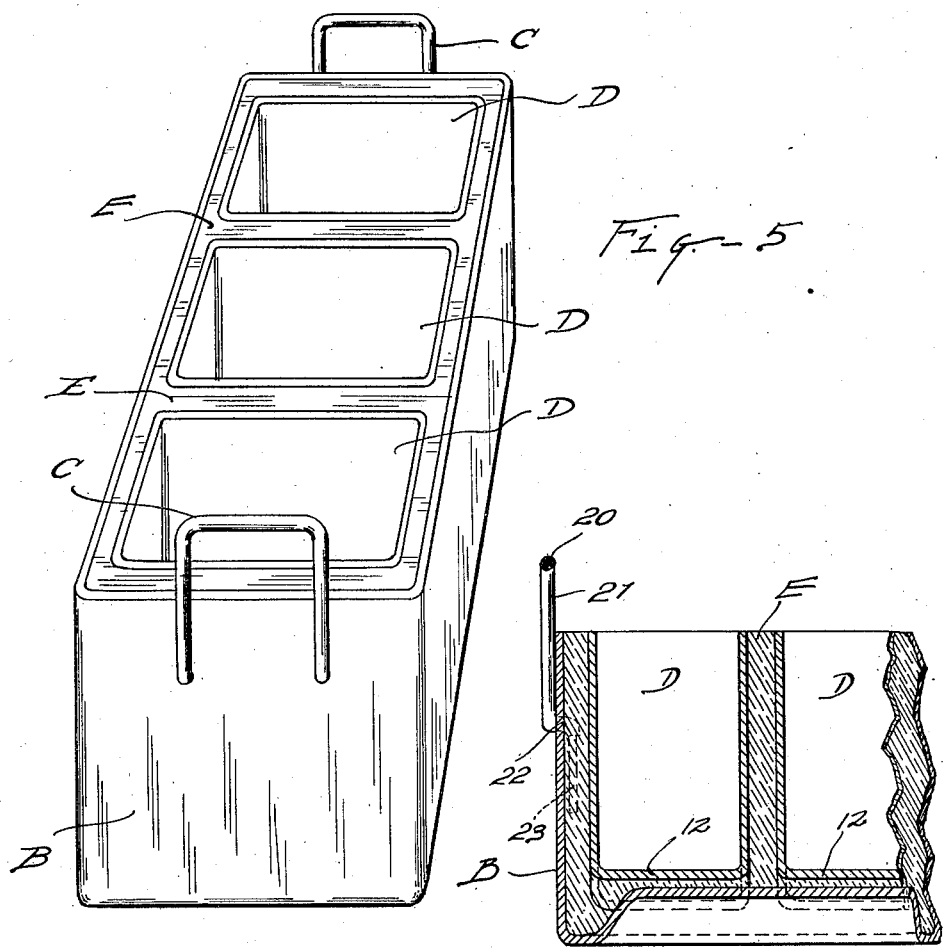
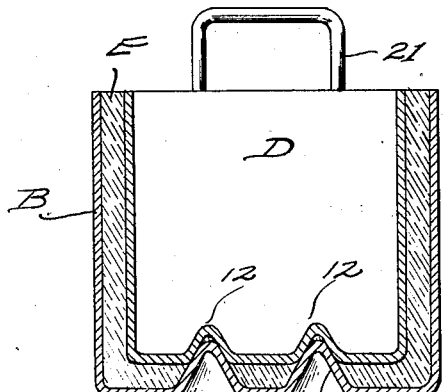
INVENTORS
Clarence W. Hazelett
Albert R. Goetrick
BY Bates & Macklin,
ATTORNEYS Jan. 12, 1926.　　　　　　　　　　　　　　　　1,569,125
C. W. HAZELETT ET AL
STORAGE BATTERY CONTAINER
Filed Feb. 2, 1922　　　3 Sheets-Sheet 3
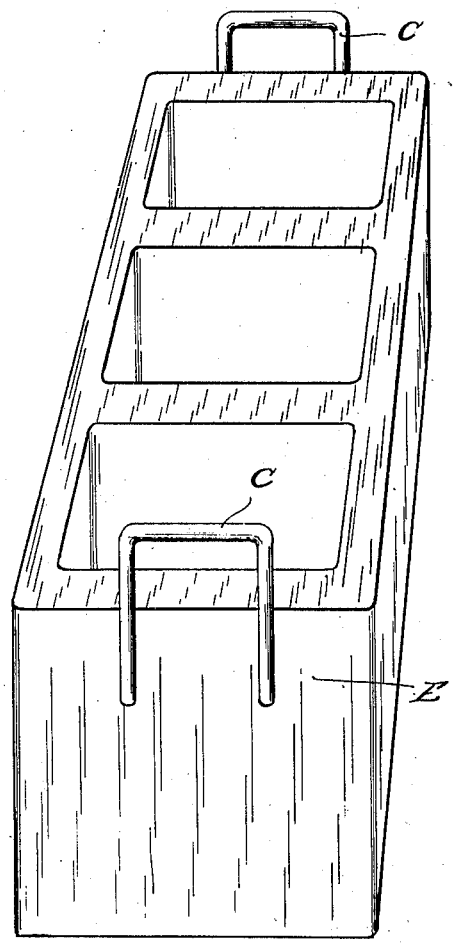
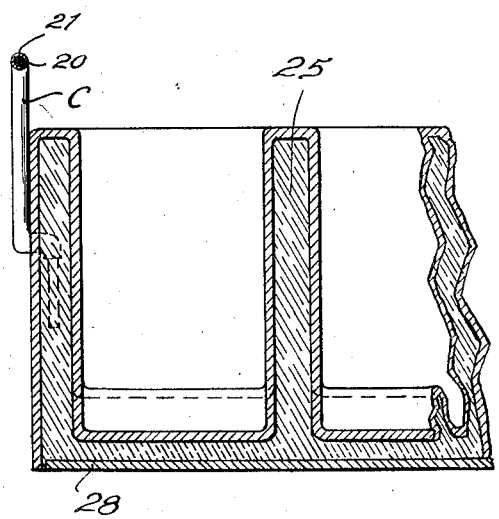
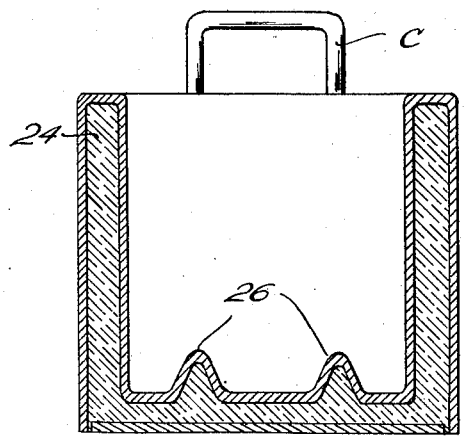

Patented Jan. 12, 1926.

1,569,125

UNITED STATES PATENT OFFICE.

CLARENCE W. HAZELETT, OF LAKEWOOD, AND ALBERT R. GOLDRICK, OF CLEVELAND, OHIO, ASSIGNORS, BY MESNE ASSIGNMENTS, TO THE CLEVELAND TRUST COMPANY, TRUSTEE, OF CLEVELAND, OHIO.

STORAGE-BATTERY CONTAINER.

Application filed February 2, 1922. Serial No. 533,684.

*To all whom it may concern:*

Be it known that we, CLARENCE W. HAZELETT and ALBERT R. GOLDRICK, citizens of the United States, residing at Lakewood and Cleveland, respectively, in the county of Cuyahoga and State of Ohio, have invented a certain new and useful Improvement in Storage-Battery Containers, of which the following is a full, clear, and exact description, reference being had to the accompanying drawings.

This invention is concerned with the manufacture of storage batteries and more specifically is directed to the economical production of storage battery containers.

Battery containers have usually been comprised of an outer wooden casing and a plurality of hard rubber jars; the jars being maintained in position within the wooden casing by wedged strips. The spaces between the upper edges of the jars and the casing are usually filled with pitch or kindred material. The rubber jars frequently crack or develop pin holes which permit the escape of the acid electrolyte from the jars, resulting in a rapid deterioration of the battery elements and the destruction of the casing.

Another development in the battery container art has been to form the jars and casing integrally of hard rubber or ebonite; the container in reality comprising a hard rubber casing provided with partition walls, which separate the casing into battery element compartments. The danger of developing cracks or pin holes is also prevalent in such a construction.

The general object of our invention, therefore, is the provision of a storage battery container construction wherein the element jars are formed of a low melting point acid resisting substance which may be poured into a mold comprised of a plurality of fibrous cell cores and an outer casing; the acid proofing material being such as to permeate the walls of the fibrous cores whereby the cores may constitute a permanent reinforcing means for retaining the molded substance in shape.

A further object is the provision of a battery container construction wherein a form composed of fibrous material is utilized as a mold in defining the walls of an acid proof container, which is comprised of pitch; the fibrous mold subsequently becoming a part of the container.

An additional object of our invention is the provision of a novel method for producing such a container.

Other objects will become apparent from the description hereinafter set forth in reference to the accompanying drawings which illustrate preferred embodiments of our invention. The essential characteristics are summarized in the claims.

In the drawings Fig. 1 is a perspective view of a three-cell battery container wherein an outer wooden casing is provided with a plurality of battery cell cavities formed in a low melting point pitch; Fig. 2 is a transverse section taken through one of the cell cavities and casing illustrating the manner of supporting the fibrous cores within the casing prior to the filling of the casing with the pitch. Fig. 3 is a similar view illustrating an alternate method of supporting the mold; Fig. 4 is a cross sectional perspective view setting forth the bottom contour of the mold. In Fig. 5 we have illustrated a three-cell container wherein the fiber cores as well as the outer casing are formed of molded paper pulp; Fig. 6 is a transverse cross sectional elevation taken through one of the molded cavities; Fig. 7 is a longitudinal cross sectional elevation through the casing and cores; Fig. 8 is an illustration of a modified form of a three-cell battery container construction wherein the casing mold and the cavity cores comprise an integral fibrous form; Fig. 9 is a transverse cross sectional elevation taken through one of the cell cavities; and Fig. 10 is a longitudinal cross sectional elevation of the container illustrated in Fig. 8.

In constructing a battery container in accordance with our invention, cores D may first be made either by compressing a paper pulp solution about a foraminous mold or by drawing the pulp onto a foraminous mold by means of suction interiorly of the mold. We prefer to provide the foraminous mold with depressed bottom forming surface, whereby the fibrous core formed thereon will have upwardly extending ribs in the bottom thereof, such as are illustrated at 12 in Fig. 4. The process of forming such molds is well known in the paper making art, and the description thereof will therefore be omitted. The ribs serve the purpose of providing exterior indentations in the bottom of the cavity cores whereby the cores may be properly positioned relative to the side walls 14 of the wooden casing A. Wooden ribs 15, having a cross section substantially the same as the indentations formed in the bottom of the cores may be secured to the bottom of the casing. These wooden ribs may serve to engage the indented surfaces of the cores, whence the cores may be maintained in position on the wooden ribs when the pitch E is being poured.

If desired, a double bottom may be placed in the casing, as illustrated in Fig. 3 in which case the ribs 15ᵃ may be formed integral with the bottom member 16. The bottom member 16 may be loosely positioned in the casing and rest on the bottom member 17; the latter member being joined to the walls of the casing in any suitable manner.

We prefer to make the width and length of the casing of such dimensions that considerable space is obtained between the respective cores D and also between the cores and the inner walls of the casing A whereby a substantial thickness of pitch may be obtained in the container walls. Upon filling of the casing the molten pitch will permeate through the fibrous walls of the cores, thus forming or molding a battery container of pitch with the walls thereof reinforced by an acid proof fibrous lining.

The cell walls may be interiorly treated with a solution of ethyl acetate and celluloid to further prevent the destruction of the reinforcing fibrous material in the cell walls.

In Fig. 5 we have illustrated a container construction wherein cell cores formed in the manner heretofore described may be placed in a casing B which is likewise formed of paper pulp. The width and length of the casing may be such that considerable space will be present between the core walls and the casing.

The casing may have ribs 18 integrally molded in the bottom thereof which serve to engage the indented portions of the core bottoms, whereby the latter may be maintained in uniformly spaced position when the spaces between the respective walls are being filled with molten pitch; the pitch being of such temperature that the walls of the casing as well as the core walls are permeated thereby before solidification takes place.

Any convenient form of handle may be secured to the casing. We prefer, however, to secure handles C to the end walls of the casing in the manner illustrated in Fig. 7. The handle may be comprised of a metallic rod 20 and an uncorrosive tubular covering 21 bent to a substantially U-shaped form with the ends thereof offset, as at 22, whereby the lower portions of the handle may be inserted in suitable openings formed in the end walls of the casing. The handles may be placed on the casing prior to the filling of the same with pitch, whereupon the inserted ends 23 become embedded in the pitch. The cell walls and the outer casing walls may be treated with an acid resisting collodian solution to further protect the fibrous structure of the mold walls, as hereinbefore mentioned.

A modified form of our container construction is illustrated in Fig. 8. In this construction the walls of the cell cores as well as the top and side walls of the casing are integrally formed of fibrous material, such as paper pulp with a substantial interior space between the core walls and casing walls, as illustrated at 24 and 25 in Figs. 9 and 10. In this construction the bottom of the mold is open, and the outer walls extend a distance beyond the bottom walls of the cores which is equal to the width of the spaces 24 and 25.

To properly support the battery elements, ribs 26 may be formed in the bottom walls of the cores which correspond in shape to the ribs formed in the core illustrated in Fig. 4. The mold is turned bottom side up and filled with molten pitch or kindred substance. The temperature of the filling material may be such that all of the mold walls will be saturated thereby. By completely filling the mold to the top of the outer walls, the mold now being bottom side up, a reinforced bottom may be obtained which supports the cores and consequently the battery plates which are subsequently placed therein. A closing strip 28 may be pressed upon the upper level of the filling material before it has sufficiently lowered in temperature to solidify. This bottom member may be comprised of a strip of cardboard or wood, as desired.

Handles C may be constructed in the manner illustrated in Figs. 5 and 7, and may be attached to the casing E in the same manner the handles C are secured to the casing B.

As a low melting point pitch is not brittle when in the solid state, the casing may be subjected to repeated shock or accidental blows without developing leaks in the cells.

It is evident that the pulp cores and the pulp casing merely comprise a mold and retaining means for bracing an integral pitch container which has a plurality of battery element compartments.

The cores, as has been hereinbefore stated, may be formed in any suitable dimensions which will result in the formation of molded cavities in the pitch suitable for the containing of storage battery plates and electrolyte.

Having thus described our invention, we claim:

1. A storage battery container comprising an outer casing, hollow moulding cores composed of permeable preformed fibrous material adapted to form a plurality of battery element cavities within the casing, said cores having the bottom walls thereof formed with hollow ribs extending into the core cavities and a fusible mass of cementuous acid proofing material filling the spaces between the casing and the core walls and the hollow portions of the rib structure of the core members, whereby the core walls are permeated with the acid proofing material and the ribs and core walls are reinforced by the solidifying acid-proofing material.

2. A storage battery container comprising an outer casing, a plurality of cores formed of moulded paper fibres, the cores having hollow ribs formed in the bottom walls thereof to extend into the core cavities, a homogeneous mass of fusible acid proofing material surrounding said walls and contained by the casing and filling the interior of the core ribs whereby paper fibre is impregnated with the acid proofing material and the ribs and walls thereof are reinforced by said material.

3. In a storage battery container, the combination of an outer casing formed of moulded paper fibres, a plurality of hollow fibrous cores disposed within the casing with substantially uniform spaces provided there-between and between the casing walls, said cores having ribs formed in the bottoms thereof extending upwardly into the core cavities and a reinforcing and acid proofing material adapted to be poured into the spaces between the core walls and the casing walls and to impregnate the fibres thereof, whereupon they become immune to the corrosive action of battery acids when said material solidifies.

4. A storage battery container comprising a unitary structure forming inner and outer spaced apart walls, the inner walls comprising battery element cells having bottom walls formed with integral ribs extending upwardly into the core cavities, all of the walls of the unitary structure comprising the casing and cells being substantially uniform in thickness, whereby this unitary structure may be completely moulded in one operation and be formed of paper fibres and a fusible acid proofing material filling all of the voids between the spaced apart walls of the unitary structure and serving to impregnate the fibres thereof to render the same acid proof.

5. In a storage battery container of the character described, the combination of a plurality of inner cell forming members, an outer casing, the cell members and casing being formed of paper fibres, said cells having ribs formed in the bottom walls thereof extending into the cell cavities, said rib structures being hollow, the casing having longitudinal ribs extending upwardly from the bottom wall thereof and in registration with the hollows of the cell ribs and fusible acid resisting material filling the spaces between the casing walls and cells and the ribs thereof and serving to impregnate the paper fibres comprising the casing walls and cell walls to render the same acid resisting.

In testimony whereof we hereunto affix our signatures.

CLARENCE W. HAZELETT.
ALBERT R. GOLDRICK.